US011325607B1

(12) United States Patent
Sanchez

(10) Patent No.: US 11,325,607 B1
(45) Date of Patent: May 10, 2022

(54) SYSTEMS AND METHODS FOR ANALYZING TELEMATICS DATA TO DETERMINE A DRIVER ON A SHARED TRIP

(71) Applicant: BLUEOWL, LLC, San Francisco, CA (US)

(72) Inventor: Kenneth Jason Sanchez, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 211 days.

(21) Appl. No.: 16/735,970

(22) Filed: Jan. 7, 2020

(51) Int. Cl.
*B60W 40/00* (2006.01)
*B60W 40/09* (2012.01)
*G01C 21/36* (2006.01)
*G01C 21/34* (2006.01)
*G07C 5/00* (2006.01)
*G07C 5/08* (2006.01)
*G06Q 40/08* (2012.01)
*B60W 40/08* (2012.01)

(52) U.S. Cl.
CPC .......... *B60W 40/09* (2013.01); *G01C 21/343* (2013.01); *G01C 21/3438* (2013.01); *G01C 21/3484* (2013.01); *G01C 21/3617* (2013.01); *G06Q 40/08* (2013.01); *G07C 5/008* (2013.01); *G07C 5/085* (2013.01); *B60W 2040/0809* (2013.01)

(58) Field of Classification Search
CPC .......... B60W 40/09; B60W 2040/0809; G01C 21/3617; G01C 21/3484; G01C 21/343; G01C 21/3438; G07C 5/008; G07C 5/085; G06Q 40/08
See application file for complete search history.

(56) References Cited

U.S. PATENT DOCUMENTS

2017/0255966 A1* 9/2017 Khoury ............... H04L 67/20
2021/0144526 A1* 5/2021 Zilberman .......... H04W 4/80

FOREIGN PATENT DOCUMENTS

JP 2018200554 A * 12/2018

OTHER PUBLICATIONS

Ito Manabu, Device and Method for Determining Passengers in Shared Vehicle, 2018, Nihon Unisys LTD, Description (Year: 2018).*

* cited by examiner

*Primary Examiner* — Jess Whittington
*Assistant Examiner* — Divya A Patel
(74) *Attorney, Agent, or Firm* — Faegre Drinker Biddle & Reath LLP

(57) ABSTRACT

A design solution for classifying users as potential drivers traveling in a vehicle based upon a combination of real-time data gathered during a shared trip and historical data. Data gathered include overlapping time and distance of users to be classified as potential drivers. Shared trip scenarios include two or more users share a complete trip from beginning to end; two or more users share the beginning of a trip where at least one user is dropped off and the other user continues driving; two or more users share the end of a trip where at least one user is picked up during the shared trip; and one user picks up another user during a trip to thereby create a shared trip and drop off the other user to a different location before heading to a final location.

20 Claims, 7 Drawing Sheets

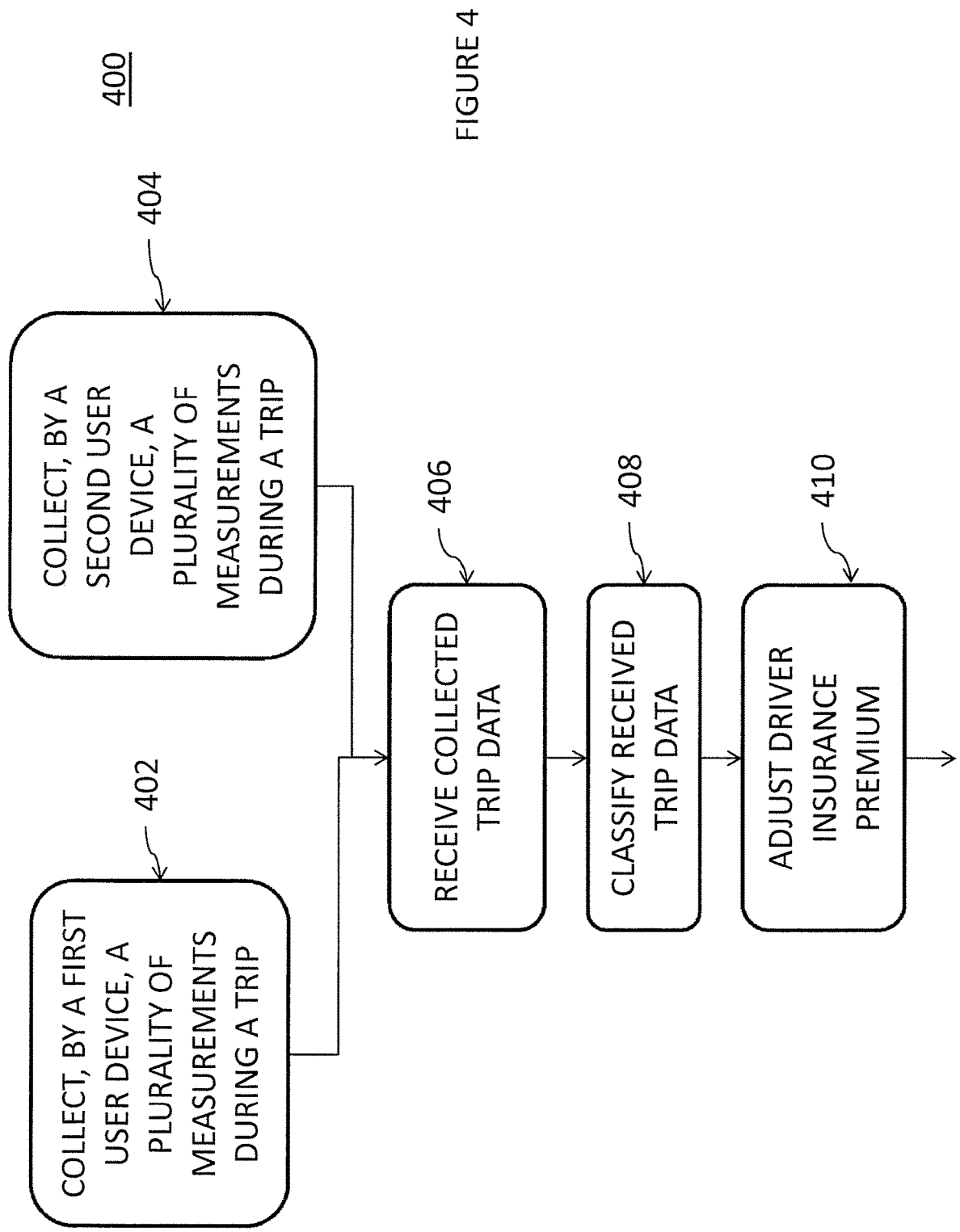

SYSTEMS AND METHODS FOR ANALYZING TELEMATICS DATA TO DETERMINE A DRIVER ON A SHARED TRIP

FIELD OF THE INVENTION

The present disclosure relates to analyzing driving telematics data to determine driving characteristics of a driver, and, more particularly, to systems and methods for determining an actual driver of a vehicle as compared to other passengers in the vehicle based at least in part upon positioning data, time data, and other telematics data.

BACKGROUND

Vehicle insurance often essentially provides financial protection against physical damage or bodily injury caused by a vehicular accident. Other financial protections may also be provided, such as vehicle theft or damage caused by natural disasters. Conventionally, car insurance rates, or premiums, are typically determined based upon a driver's age and driving history, car make, model, and year, among a myriad of other factors.

Some vehicle insurance companies provide premium discounts to drivers that exhibit safe driving characteristics. Discounts are typically calculated based upon annual mileage and basic driving characteristics, such as braking, speed, time of day travel, acceleration rates, and fast cornering. Vehicles may be equipped with navigation systems capable of tracking driving characteristics. Also, mobile computing devices of drivers of vehicles may be used to gather certain telematics data. For example, a mobile computing device associated with a driver may track the driver's driving behavior during vehicle operation. Tracking is typically done via one or more integrated sensors or other devices, such as geo-spatial positioning modules, accelerometers, and gyroscopes. However, problems may arise when an insurance customer is misclassified as the driver of the vehicle when the insurance customer is actually riding as a passenger in a vehicle.

Satellite navigation systems such as global positioning system (GPS) utilize satellites to provide geo-spatial positioning for a variety of applications. A GPS-equipped device may provide a location of a mobile computing device with respect to, for example, a geographic coordinate system and/or geographic landmarks (e.g., streets, political entities, points of interest, etc.). Current GPS-equipped devices are generally not capable of determining the exact location of the device, but rather provide an estimate of the device's current location subject to some degree of error. For example, atmospheric effects (e.g., ionospheric delay) and/or artificial interference (e.g., a presence of metal and/or electromagnetic devices) may introduce error to a GPS-based determination of location.

Some systems may benefit from an ability to identify an actual driver of a vehicle for a shared trip using mobile computing devices carried by users in the vehicle in combination with other statistics. Identifying the driver may be useful in computer applications that utilize telematics data to assess the driver of the vehicle, such as for insurance purposes. In such applications, the driver of the vehicle for a trip must be distinguished from passengers, so that telematics data captured during the trip may be used to assess how the driver is driving and not incorrectly assign the driver's driving characteristics to that of the passengers. However, currently available GPS technology lacks the precision to make an identification of an actual driver of a vehicle based upon measured geographic coordinates alone.

BRIEF SUMMARY

The present embodiments may relate to, inter alia, systems and methods for assigning a shared trip to a single driver of a vehicle for a particular trip. Some embodiments of the present disclosure may use, for example, a combination of statistical data (e.g., trip start/stop times, shared distance times, etc.), geographical location measurements made by a global positioning system (GPS), and historical trip data to identify and assign at least one user as a driver of a vehicle during a shared trip. In some embodiments, a usage-based insurance (UBI) policy may be applied to the identified driver of the vehicle.

In one aspect, a driver identification (DI) computing device having at least one processor in communication with a memory device may be provided. The at least one processor may be configured to: associate a first user with a first user device; associate a second user with a second user device; receive, from the first user device, a first plurality of measurements periodically captured by the first user device during a first trip; receive, from the second user device, a second plurality of measurements periodically captured by the second user device during a second trip; identify a shared trip based upon the captured first and second plurality of measurements; and determine, based upon the captured first and second plurality of measurements, a driver of a vehicle, in response to the first and second trip being a shared trip.

The at least one processor may be further configured to: calculate a time and distance for each of the first trip and the second trip in response to determining that the first trip has a start time or end time that overlaps with the end time or start time of the second trip; calculate an overlapping time and distance between the first trip and the second trip; and calculate a distance shared between the first trip and the second trip.

The at least one processor may be further configured to, for identifying a shared trip: classify the first trip and the second trip as a shared trip in response to determining that the overlapping distance is less than the distance of the first trip or the second trip.

The DI computing device may further include wherein the higher driving probability is based at least in part on historical data stored in a user profile of the first or second users.

The DI computing device may further include wherein each of the first plurality of measurements and each of the second plurality of measurements includes timing data, geographical location data, and telematics data.

The DI computing device may further include wherein the first plurality of measurements and the second plurality of measurements are collected by one or more sensors attached to a vehicle, the first user device, the second user device, or a combination thereof. The processor of the DI computing device may include additional, less, or alternate functionality, including that discussed elsewhere herein.

In another aspect, a computer-based method for designating a driver of a shared trip between two or more users may be provided. The computer-based method may include collecting, by a plurality of user devices, a plurality of measurements for a plurality of trips; receiving, at a driver identification (DI) computing device, the plurality of measurements; and designating, by the DI computing device, a driver based upon the plurality of measurements.

The method may further include storing the plurality of measurements in a storage device in communication with the DI computing device; associating the plurality of measurements with respective users of the two or more users; and creating a user profile for each of the two or more users based upon the plurality of measurements. The computer-based method may include additional, less, or alternate functionality, including that discussed elsewhere herein.

In yet another aspect, at least one non-transitory computer-readable storage media having computer-executable instructions embodied thereon may be provided that, when executed by at least one processor, the computer-executable instructions cause the processor to: receive trip data from a plurality of user devices, wherein each user device is associated with a user of a plurality of users; identify a first user of the plurality of users having trip data that overlaps with trip data of a second user of the plurality of users; classify at least a portion of the trip data of the first and second users as a shared trip; and designate at least one of the first and second users as a driver of the shared trip. The computer-executable instructions may include additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 4 is a flowchart showing an example method for implementing driver designation of a vehicle for a shared trip using the DI computer system illustrated in FIG. 1.

Figure 1:
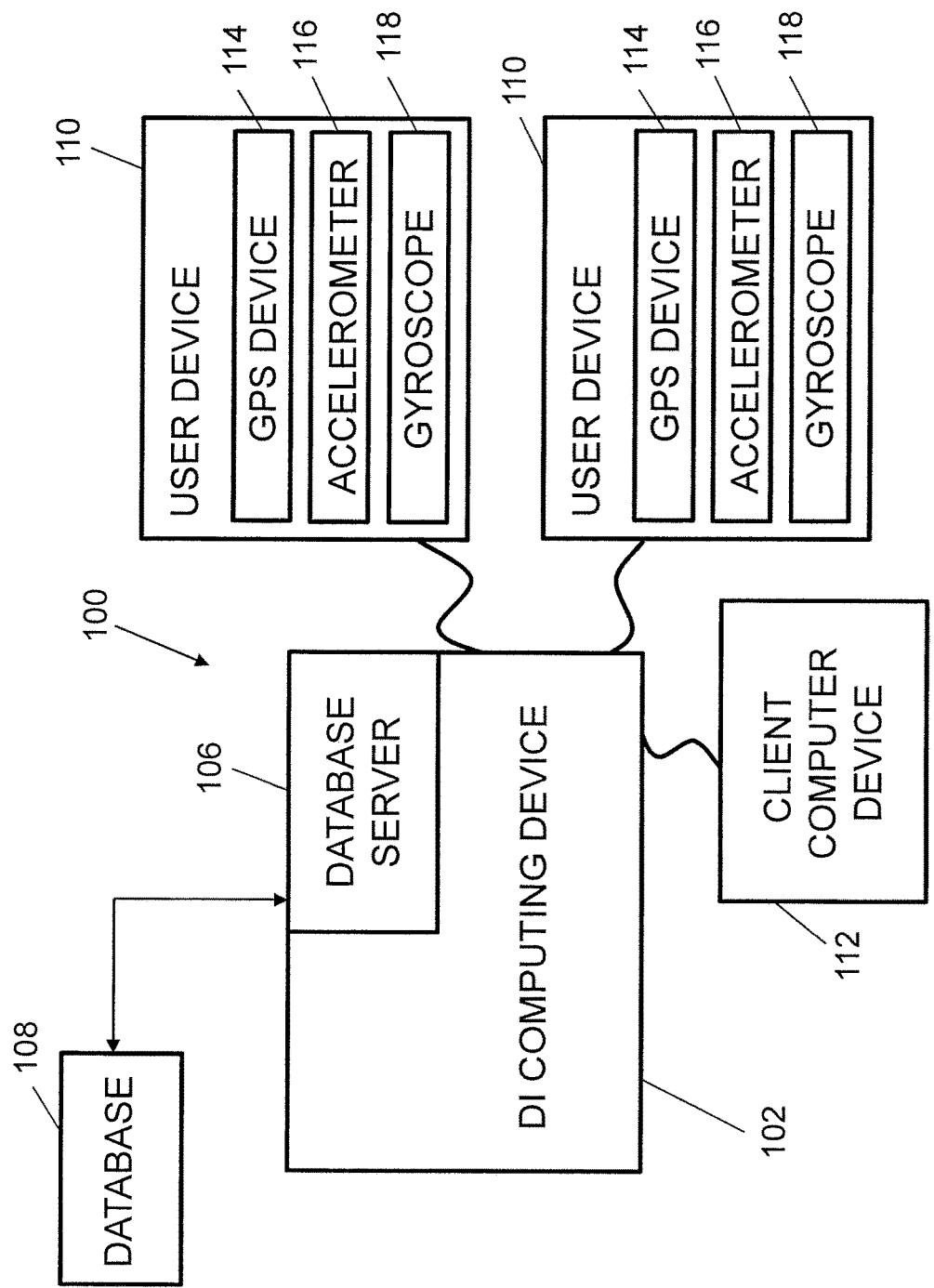
FIG. 1 is a block diagram illustrating an example driver identification (DI) computer system in accordance with an example embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The subject matter will now be descried in detail for specific embodiments. It is understood that the described embodiments are intended only as illustrative examples and are not to be limited thereto.

The present embodiments may relate to, inter alia, systems and methods for identifying a driver of a vehicle for a shared trip. In some embodiments, the systems and methods described herein may include receiving measurements of geographic location and other telematics data (e.g., acceleration, velocity, orientation, etc.) from a plurality of user devices (e.g., mobile computing devices) or other sensors present in the vehicle during trips of each respective user device. Further analysis of this received data may reveal that two or more of the plurality of user devices may be part of a shared trip. For example, overlapping times and geographical locations of trips taken by some of the plurality of user devices may be classified as occurring during the same trip, and therefore regarded as a shared trip between the user devices and users associated with the user devices. In one example embodiment, the process may be performed by a driver identification (DI) computing device, which may be part of a DI computer system. Collected measurements may be analyzed by the DI computing device to identify a shared trip and the users associated with the shared trip. Further data analysis may be performed using different algorithms to designate at least one of the identified users as an actual driver of a shared trip. In some embodiments, the user devices may have stored thereon an application (e.g., an insurance application) that is configured to generate and store driving characteristics (e.g., braking, speed, time of day travel, acceleration rates, and fast cornering) of the driver. The driving characteristics may be used in determining insurance rates for users, so it may be needed that driving characteristics only be associated with the driver, not passengers, of the vehicle during each trip.

In some embodiments, the systems and methods described herein may additionally or alternatively include receiving, along with the measurements of geographic coordinates, telematics data (e.g., accelerometer and/or gyroscope measurements), and using the measured geographic coordinates and telematics data to calculate a probability for each user device that the user device corresponds to the driver of the vehicle.

In some embodiments, the systems and methods described herein may additionally or alternatively include receiving, along with the measurements of geographic coordinates, historical data (e.g., past trips driven, time of day statistics), and using the measured geographic coordinates and historical data to calculate a probability for each user device that the user device is associated with the driver of the vehicle.

In some embodiments, the systems and methods described herein may additionally or alternatively include processing, along with the measurements of geographic coordinates, statistical data (e.g., overlapping time and distance data of route segments shared between two or more user trips), to classify multiple user trips as a shared trip and to calculate a probability for each user device that the user device is associated with the driver of the vehicle.

In some embodiments, the systems and methods described herein may additionally or alternatively include processing a combination of one or more of measurements of geographic coordinates, historical data, and statistical data to identify shared trips and calculate a probability for each user device that the user device is associated with the driver of the vehicle.

As described below, the systems and methods described herein determine a probability that a user device is associated with the actual driver of the vehicle as opposed to one of the passengers of the vehicle during a shared trip in accordance with certain scenarios. As used herein, "driver" refers to a user actually driving a vehicle, and "passenger" refers to any user that is not driving and present in a vehicle. By so doing, the driver of the vehicle for a particular shared trip may be identified.

In some example embodiments, the systems and methods described herein may be used to identify and designate at least one user as a driver in a plurality of possible scenarios. Further, the systems and methods may segment trips and identify sub-trips. For example, a first user may travel a certain distance between points A, B, and C and a second user may travel a portion of this distance, such as between point B and point C. In this non-limiting example, the second user completes only a portion of the entire trip, a "sub-trip," and the first user completes the entire journey from start to finish, the "trip." The trip may include a plurality of sub-trips, or segmented portions of the entire trip from start to finish that may vary in length and number of users in the vehicle. In some example embodiments described herein, different trips between users may have overlapping times, and the sub-trips may have different starting and ending times. In these instances, sub-trips are determined and analyzed to designate a driver amongst a plurality of users. In some embodiments, a shared trip may be identified as any trip or sub-trip shared between at least two users (e.g., as determined by GPS data, timing data, latitude-longitude data, distance data, and/or telematics data of the user devices associated with the users).

In some example embodiments, the systems and methods may be used to classify a new trip as part of a shared trip among other user trips. As new trip data is received, a determination may be made as to whether or not the new trip data should be associated with a previously submitted trip associated with another user. If overlapping data is found between two or more logged trips, a shared trip may be identified. Once a shared trip is identified, it may then be needed to adequately determine among the users associated with the shared trip, the driver of the vehicle during the shared trip. New trip data may include, inter alia, GPS data, timing data, latitude-longitude data, distance data, telematics data, or the like. Further, for example, a database of previously logged trips may be queried, such as a dataset containing logged trips from the past 30 days.

In some example embodiments, the systems and methods may be used to implement a usage-based insurance platform. In usage-based insurance policies of usage-based insurance platforms, insurance premiums may correspond to driving behaviors and/or characteristics of users. The insurance premiums may be based in part upon telematics data collected from a user device associated with the user. For example, if telematics data associated with a user show that the user has generally safe driving behaviors and characteristics, the insurance premium for the user may be low. Further, if telematics data associated with a user show that the user has generally hazardous and unsafe driving behaviors and characteristics, the insurance premium for the user may be high. It is thus advantageous to determine when a user is actually driving a vehicle and when the user is merely a passenger of a vehicle. By identifying a driver of a vehicle for a shared trip, the systems and methods enable telematics data collected for the shared trip to be applied in analyzing the driving behaviors and characteristics of only the identified driver.

At least one of the technical problems address by this system may include: (i) inability of a GPS device to provide a geographic location measurement sufficiently precise to be used to identify the driver of a vehicle; (ii) inability of a computing device to automatically designate a driver of a vehicle based upon telematics data; (iii) inefficiency in identifying a driver of a vehicle due to an inability of a computing device to automatically identify a driver of a vehicle based upon telematics data; (iv) inability of a computing device to automatically designate a driver of a vehicle among a pool of possible drivers during a shared trip; and (v) inefficiency in providing usage-based insurance coverage due to an ability of a computing device to automatically designate the driver of a vehicle in order to apply telematics data associated with a shared trip to a usage-based insurance policy associated with the driver.

A technical effect of the systems and processes described herein may be achieved by performing at least one of the following steps: (i) receiving, from a first user device, a first plurality of measurements periodically captured at the first user device during a trip taken by a vehicle; (ii) receiving, from a second user device, a second plurality of measurements periodically captured at the second user device during a trip taken by a vehicle; (iii) determining, based upon the first plurality of measurements and the second plurality of measurements, that the first user device and the second user device are within the same vehicle during the trip; and (iv) designating at least one of the user devices as being associated with a driver of the vehicle during the trip based upon the first and second plurality of received measurements.

The technical effect achieved by this system may be at least one of: (i) ability of a GPS device and a timing mechanism to provide measurements sufficiently precise to be used to identify the driver of a vehicle; (ii) ability of a computing device to automatically identify a driver of a vehicle based upon the provided measurements; (iii) increased efficiency in identifying a driver of a vehicle due to an ability of a computing device to automatically identify a driver of the vehicle based upon the provided measurements; and (iv) increased efficiency in providing usage-based insurance coverage due to an ability of a computing device to automatically identify the driver of a vehicle in order to apply telematics data associated with the trip to a usage-based insurance policy associated with the driver.

Exemplary Computer System for Designating a Driver

FIG. 1 depicts an example driver identification (DI) computer system 100. DI computer system 100 may include a DI computing device 102 (also referred to herein as DI server or DI computer device). DI computing device 102 may include a database server 106. DI computing device 102 may be in communication with, for example, one or more of a database 108, one or more user devices 110, and a client computing device 112. User devices 110 may be, for example, mobile computing devices. In some embodiments, DI computing device 102 may communicate with additional user devices substantially similar to user devices 110. In some embodiments, client computer device 112 may be associated with, for example, an insurer providing a usage-based insurance (UBI) policy to users associated with user devices 110.

In the exemplary embodiment, user devices 110 may be computers that include a web browser or a software application, which enables user devices 110 to access remote computer devices, such as DI computing device 102, using the Internet or other network. More specifically, user devices 110 may be communicatively coupled to DI computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. User devices 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, user devices 110 may be associated users, and the users may be drivers or passengers of a vehicle.

Client computer device 112 may be communicatively coupled with DI computing device 102. In some embodiments, client computer device 112 may be associated with, or is part of a computer network associated with an insurance provider, or in communication with the insurance provider's computer network (not shown). In other embodiments, client computer device 112 may be associated with a third party and is merely in communication with the insurance provider's computer network. More specifically, client computer device 112 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client computer device 112 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Database server 106 may be communicatively coupled to database 108 that stores data. In one embodiment, database 108 may include data from user devices 110, data regarding the users associated with user devices 110, insurance policies relating to client computer devices 112, etc. In an example embodiment, database 108 may be stored remotely from DI computing device 102. In some embodiments, database 108 may be decentralized.

DI computing device 102 may receive geographic coordinate data (e.g., global positioning system (GPS) data), time measurement data, and/or telematics data from user devices 110 and/or other sensors (e.g., sensors associated with a vehicle). User devices 110 may include components for capturing and generating data including a GPS device 114, an accelerometer 116, a gyroscope 118, and/or any other device components for capturing and generating data. DI computing device 102 may use the received geographic coordinate data (e.g., from GPS device 114 of user devices 110) and telematics data (e.g., from user devices 110) to determine a location and timing of the determined location of one user device 110 with respect to other user devices 110.

User devices 110 may be equipped with, for example, GPS device 114. GPS device 114 may utilize GPS techniques to determine a measurement of geographic coordinates of the corresponding user device 110. GPS device 114 may also provide real-time and historic navigation data. Because some factors (e.g., atmospheric effects) may reduce the precision of GPS device 114, GPS device 114 may return, for example, an error estimate along with the measured geographic location. The measured geographic location and error estimate may provide an area (e.g., a radius around the measured geographic location) where the corresponding user device 110 may be located associated with a probability that user device 110 is in the measured geographic location.

User devices 110 may also be equipped with, for example, accelerometer 116 and/or gyroscope 118. Accelerometer 116 may be capable of measuring a linear and/or angular acceleration of the corresponding user device 110 at a given time. Gyroscope 118 may be capable of determining an orientation of user device 110. Accordingly, accelerometer 116 and gyroscope 118 together may be used to determine a direction of acceleration of user devices 110. Data generated by accelerometer 116 and gyroscope 118 may be used (e.g., by DI computing device 102 or user devices 110) to generate telematics data (e.g., a location, orientation, acceleration, velocity, etc.) of the corresponding user device 110. Such telematics data may be used by DI computing device 102 to generate an enhanced measurement of the geographic location of user device 110 to determine, for example, whether (i) user device 110 is associated with a user who is a driver of a vehicle for a shared trip, (ii) user device 110 is associated with a user who is a passenger of the vehicle for the shared trip, and/or (iii) user device 110 is associated with a user who is another driver driving closely to the vehicle of the shared trip (e.g., the vehicle with user devices 110 being analyzed by DI computing device 102).

For example, DI computing device 102 may determine (e.g., using data from GPS device 114, accelerometer 116, and/or gyroscope 118) that two or more user devices 110 are traveling in the same vehicle together based upon a determination that, over time, the two or more user devices 110 have the same direction of travel, and the two or more user devices 110 remain constant with respect to the direction of travel. That is, DI computer device 102 may determine that the two or more users associated with the two or more user devices 110 are participants in a shared trip. DI computing device 102 may further determine one user device 110 is on average one meter to the right of and zero meters behind another user device 110. In some embodiments, DI computing device 102 may generate a map depicting the relative position of user devices 110 determined to be in the same vehicle.

In some embodiments, DI computing device 102 may determine that two or more user devices 110 are traveling in the same vehicle for a certain period of time (e.g., during a sub-trip, as defined above). A first user device 110 may have a certain direction of travel over a period of time, thereby creating a series of relative positions. A second user device 110 may also have a certain direction of travel over a period of time, thereby creating another series of relative positions. DI computing device 102 may receive the series of relative positions for each user device 110 and determine overlap between the two series of relative positions. In one example, a shared trip may be identified if an overlapping distance between the two series of relative positions is less than the distance of at least one of the two series of relative positions. For example, the shared trip (e.g., the sub-trip of the total trip) may be identified as the overlap between the series of relative positions (e.g., a route or distance of travel) of the first user device 110 and the series of relative positions of the second user device 110.

In some embodiments, DI computing device 102 may determine which user device 110 is associated with the driver of the vehicle during a shared trip. For example, a first user device 110 may be determined to be associated with the driver of the vehicle if the first user device 110 has no overlap with any other user devices 110 (e.g., the first user device 110 is not associated with a shared trip). If the relative positions of the first user device 110 start to overlap with the relative positions of a second user device 110, DI computing device 102 may determine that a sub-trip is shared between the user associated with the first user device 110 and the user associated with the second user device 110. Further, DI computing device 102 may determine that the driver of the vehicle is still associated with the first user device 110. For example, since the shared sub-trip is shorter than the trip of the user associated with the first user device 110, DI computing device may determine that the driver of the whole trip, including the shared sub-trip, is associated with the first user device 110. For example, DI computing device 102 may determine that the driver associated with the first user device 110 picked up a passenger associated with the second user device 110 and that the driver associated with the first user device 110 is still the driver. Further, for example, if the relative positions of the first user device 110 and the second user device 110 start to overlap but the first user device 110 is determined to be in a different position during the shared sub-trip with the second user device 110 than at the start of the trip, DI computing device 102 may determine that the user associated with the second user device is the driver and that the user associated with the first user device 110 is now the passenger. Further, for example, if the relative positions of the first user device 110 and the second user device 110 start a trip overlapping but then the relative positions stop overlapping (e.g., the user associated with the second user device 110 is dropped off), DI computing device 110 may determine that the driver is the user associated with the first user device 110 for the duration of the trip (including the sub-trip with the second user device 110).

In some embodiments, DI computing device 102 may determine a driver of a vehicle based upon highest driving probability data. DI computing device 102 may determine that a first user device 110 and a second user device 110 are traveling in the same vehicle for a certain period of time based upon received data (e.g., geographic coordinates and timestamp data from user devices 110). For the shared trip, DI computing device 102 may determine which user device 110 is associated with the user who is the actual driver based upon comparing historic and current driver characteristics and/or behavior data (e.g., based upon telematics data). For example, DI computing device 102 may compare historic driver characteristics and/or behavior data (e.g., from user devices 110 and/or stored in database 108) of the user associated with the first and second user devices 110 with current driver characteristics and/or behavior data (e.g., from user devices 110) to determine which user is the driver. That is, if the historical characteristics and behavior data of the user associated with the first user device shows that the user is a very safe driver and the current telematics data shows erratic driving, DI computing device 102 may determine that there is a high probability that the user associated with the first user device 110 is not the driver and that the driver is the user associated with the second user device 110. DI computing device 102 may determine the driver for trips and/or sub-trips of a shared trip. Based upon all gathered data (e.g., different current driving characteristics/behavior and/or different user devices 110 determined to be involved with the trip and sub-trips), DI computing device 102 may designate a different driver for each sub-trip of the shared trip.

In some embodiments, DI computing device 102 may determine that two user devices 110 are traveling in the same vehicle based upon a determination that, over time, the two user devices 110 are sufficiently proximate to each other and have the same direction of travel. DI computing device 102 may then use telematics data to determine a relative position of one user device 110 with respect to the other user device 110.

In some embodiments, DI computing device 102 may utilize machine learning techniques to determine the position of the user devices 110 based upon telematics data. For example, DI computing device 102 may identify a certain pattern in telematics data as indicative of a first user device 110 having a certain position relative to a second user device 110. When DI computing device 102 receives telematics data that matches such a pattern, DI computing device 102 may determine the relative position of the user devices 110 based upon the pattern over time. In some embodiments, DI computing device 102 may utilize, for example, the machine learning techniques to determine a probability that a user associated with the first user device 110 and a user associated with the second user device 110 corresponds to the driver of vehicle. DI computing device 102 may then identify the driver as the user associated with the user device 110 having the highest probability of corresponding to the driver of the vehicle. For example, DI computing device 102 may determine, based upon a determined relative position of the first user device 110 and the second user device 110, that the first user device 110 has an 80 percent chance of corresponding with a driver of the vehicle, that the second user device 110 has a 10 percent chance of corresponding with the driver, and that there is a 10 percent chance that both user devices 110 do not correspond with the driver. DI computing device 102 may accordingly identify the first user device 110 as corresponding to the driver of the vehicle.

In some embodiments, DI computing device 102 may verify the identification of the driver. For example, DI computing device 102 may transmit a verification message to users associated with user devices 110 (e.g., via a text message, a push notification, and/or via a mobile application running on user devices 110). The verification message may only be sent to user device 110 associated with the user that DI computing device 102 has determined is most probably the driver, and/or the verification message may be sent to each user device 110 associated with the determined shared trip. For example, the verification message may request that the probable driver verify that they are the driver and/or the verification message may request that each user of a shared trip indicate whether they are the driver or a passenger. In some embodiments, DI computing device 102 may use responses to the verification messages to improve a machine learning model used to determine the relative position of user devices 110 and/or identify user device 110 associated with the driver.

In some example embodiments, DI computing device 102 may be used to implement a usage-based insurance (UBI) platform and/or may be associated with client computer device 112 that implements the UBI platform. In UBI policies of UBI platforms, insurance premiums may correspond to driving behaviors and/or characteristics of users (e.g., as determined by telematics data from user devices 110). It is thus important to determine when a user is actually driving a vehicle and when the user is merely a passenger of a vehicle. By identifying a driver of a vehicle for a shared trip, DI computing device 102 assists in ensuring that telematics data collected for shared trips are associated with only the determined driver of the vehicle, and not the passengers of the vehicle.

Exemplary Client Computing Device

Figure 2:
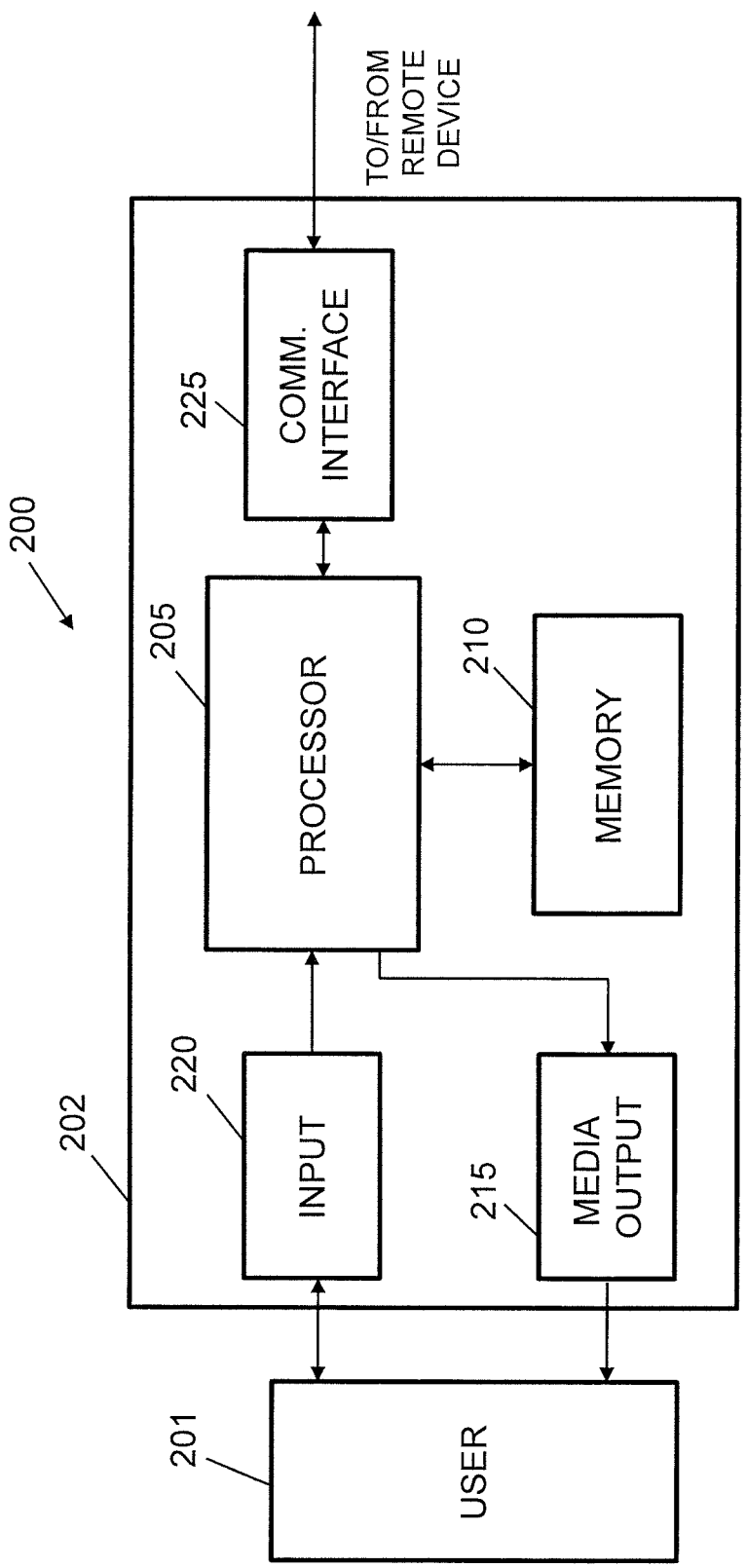
FIG. 2 is a block diagram of an example client computing device that may be used with the DI computer system illustrated in FIG. 1.

FIG. 2 depicts an example configuration of a computer system 200 that includes a client computing device 202 that may be used with DI computer system 100 shown in FIG. 1. Client computing device 202 may be, for example, at least one of user devices 110 and/or client computer device 112 (all shown in FIG. 1).

Client computing device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or other data to be stored and retrieved. Memory area 210 may include one or more computer readable media.

In example embodiments, client computing device 202 may also include at least one media output component 215 for presenting information to a user 201. Media output component 215 may be any component capable of conveying information to user 201. In some embodiments, media output component 215 may include an output adapter such as a video adapter and/or an audio adapter. An output adapter may be operatively coupled to processor 205 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones). Media output component 215 may be configured to, for example, display an alert message identifying a statement as potentially false.

Client computing device 202 may also include an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Client computing device 202 may also include a communication interface 225, which can be communicatively coupled to a remote device such as DI computing device 102 (shown in FIG. 1). Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 may be, for example, computer-readable instructions for providing a user interface to user 201 via media output component 215 and, optionally, receiving and processing input from input device 220. A user interface may include, among other possibilities, a web browser and client application. Web browsers may enable users, such as user 201, to display and interact with media and other information typically embedded on a web page or a website.

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Exemplary Server System

Figure 3:
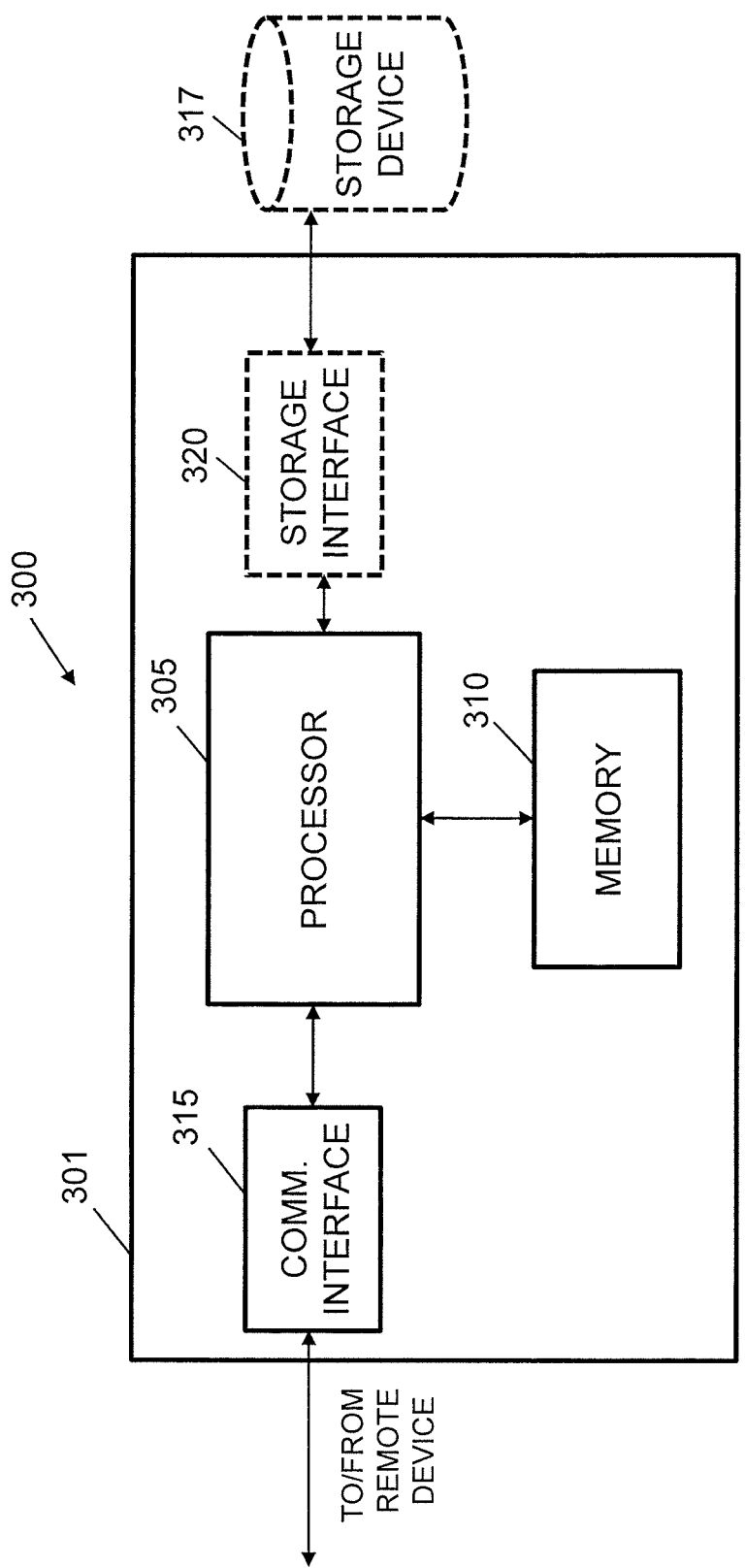
FIG. 3 is a block diagram of an example server system that may be used with the DI computer system illustrated in FIG. 1.

FIG. 3 depicts an example server system 300 that may be used with DI computer system 100, illustrated in FIG. 1. Server system 300 may include a server computer device 301, and server computer device 301 may be, for example, DI computing device 102 and/or database server 106 (shown in FIG. 1).

In example embodiments, server computer device 301 may include a processor 305 for executing instructions. Instructions may be stored in a memory area 310. Processor 305 may include one or more processing units (e.g., in a multi-core configuration) for executing instructions. The instructions may be executed within a variety of different operating systems on server computer device 301, such as UNIX, LINUX, Microsoft Windows®, etc. It should also be appreciated that upon initiation of a computer-based method, various instructions may be executed during initialization. Some operations may be needed in order to perform one or more processes described herein, while other operations may be more general and/or specific to a particular programming language (e.g., C, C#, C++, Java, or other suitable programming languages, etc.).

Processor 305 may be operatively coupled to a communication interface 315 such that server computer device 301 is capable of communicating with a remote device such as another server computer device 301, DI computing device 102, user devices 110, and/or client computer device 112 (all shown in FIG. 1). For example, communication interface 315 may receive requests from user devices 110 and/or client computer devices 112 via the Internet.

Processor 305 may also be operatively coupled to a storage device 317, such as database 108 (shown in FIG. 1). Storage device 317 may be any computer-operated hardware suitable for storing and/or retrieving data. In some embodiments, storage device 317 may be integrated in server computer device 301. For example, server computer device 301 may include one or more hard disk drives as storage device 317. In other embodiments, storage device 317 may be external to server computer device 301 and may be accessed by a plurality of server computer devices 301. For example, storage device 317 may include multiple storage units such as hard disks or solid state disks in a redundant array of inexpensive disks (RAID) configuration. Storage device 317 may include a storage area network (SAN) and/or a network attached storage (NAS) system.

In some embodiments, processor 305 may be operatively coupled to storage device 317 via a storage interface 320. Storage interface 320 may be any component capable of providing processor 305 with access to storage device 317. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 317.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Processor 305 may execute computer-executable instructions for implementing aspects of the disclosure. In some embodiments, processor 305 may be transformed into a special purpose microprocessor by executing computer-executable instructions or by otherwise being programmed, as described below in more detail with regard to FIGS. 4, 5A, and 5B.

Exemplary Method for User Data Collection

FIG. 4 depicts an example method 400 for collecting user data, designating a driver of a shared trip based upon the collected user data, and adjusting usage-based insurance (UBI) rates accordingly. Method 400 may be performed by DI computing device 102 in conjunction with user devices 110 (shown in FIG. 1).

Method 400 may include collecting 402, by a first user device (e.g., user device 110 illustrated in FIG. 1) and collecting 404, by a second user device (e.g., user device 110 illustrated in FIG. 1) a plurality of measurements during a trip. A trip may include the traveling from point A to point B by a vehicle (e.g., a car, truck, motorcycle, or the like). In another embodiment, a trip may include intermediate stops between points A and B (e.g., sub-trips). In some embodiments, the plurality of measurements during the trip may include geographic location, timestamp data, telematics data corresponding to the measured geographic location, and driver designation information. In some embodiments, before, during, or after a trip, a user may designate themselves as "driver" or "passenger." In other embodiments, DI computing device 102 (shown in FIG. 1) may determine the driver for the trips and sub-trips.

Method 400 may further include receiving 406 collected trip data at DI computing device 102. DI computing device 102 may receive trip data measurements from a plurality of user devices 110. The received trip data measurements may then be stored for later processing and classification. In some embodiments, trip data may be stored in a database, such as database 108, illustrated in FIG. 1. In another embodiment, trip data may be stored in a cache for quick retrieval.

Method 400 may further include classifying 408 the received trip data. In some embodiments, received trip data may be self-identified. For example, a user may identify that, during one or more specific trips or sub-trips, the user was a driver or a passenger. In some embodiments, the user may not have signified whether they were a driver or a passenger. In these instances, DI computing device 102 may assign a probability that each user (e.g., the user associated with the first and second user devices) was the driver during a certain trip. In some embodiments, further processing may be undertaken of all received data to determine whether a shared trip with other users has occurred. This further processing is expanded upon in conjunction with FIGS. 5A and 5B.

Method 400 may include adjusting 410 a user's driver insurance premium. In an instance where a user subscribes to usage-based insurance, telematics data gathered may adjust a driver's premiums. For example, with a usage-based insurance policy, an insurance premium corresponds to a driver's actual driving behavior. Safer driving habits detected by the telematics data, such as avoiding excessive speed or hard braking events, may cause a user's insurance premium to be discounted.

Exemplary Computer-Implemented Method for Classifying New Trip Data

Figure 5A:
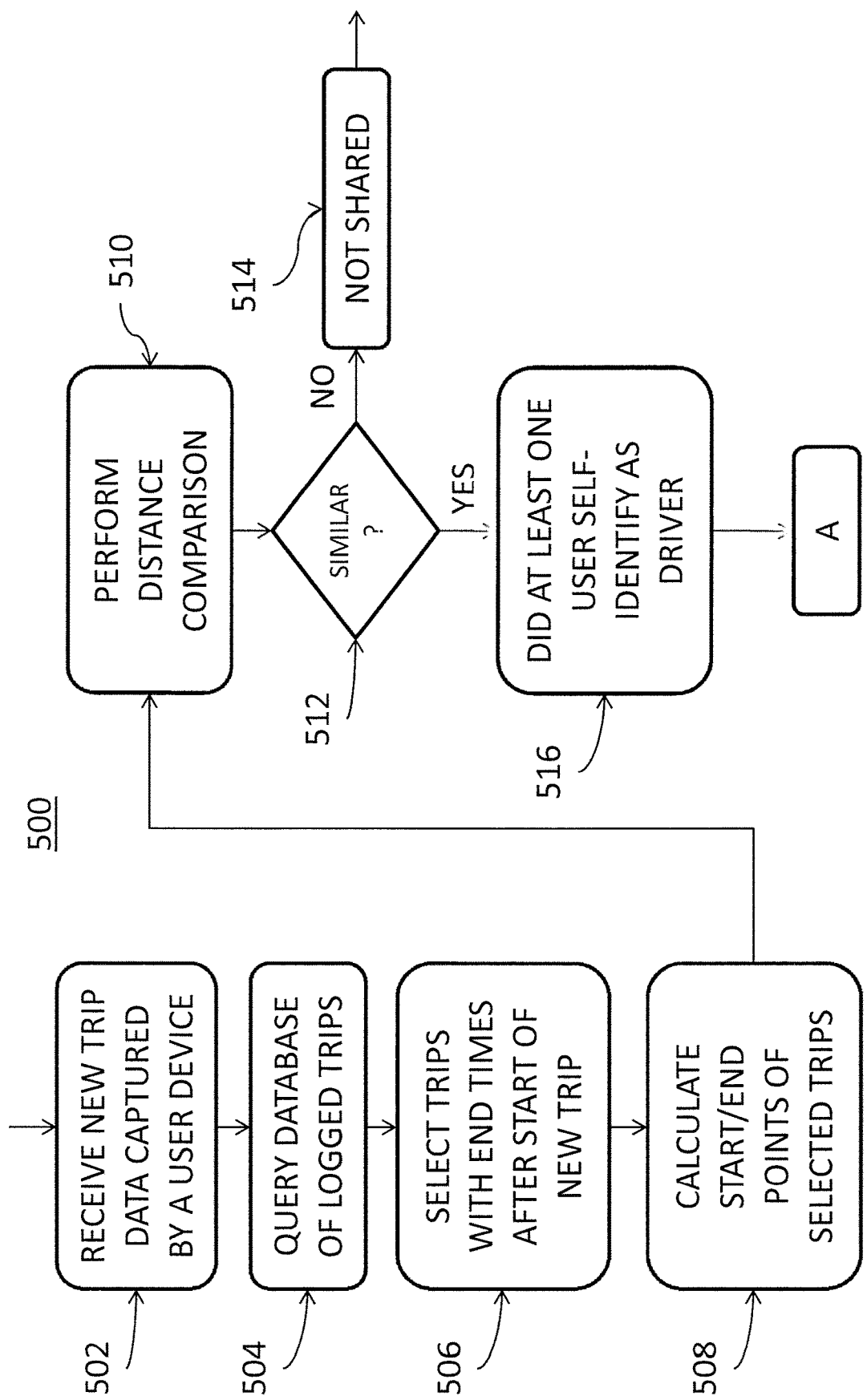
FIGS. 5A and 5B are flowcharts showing an example method for classifying new trip data received by the DI computer system illustrated in FIG. 1.
Figure 5B:
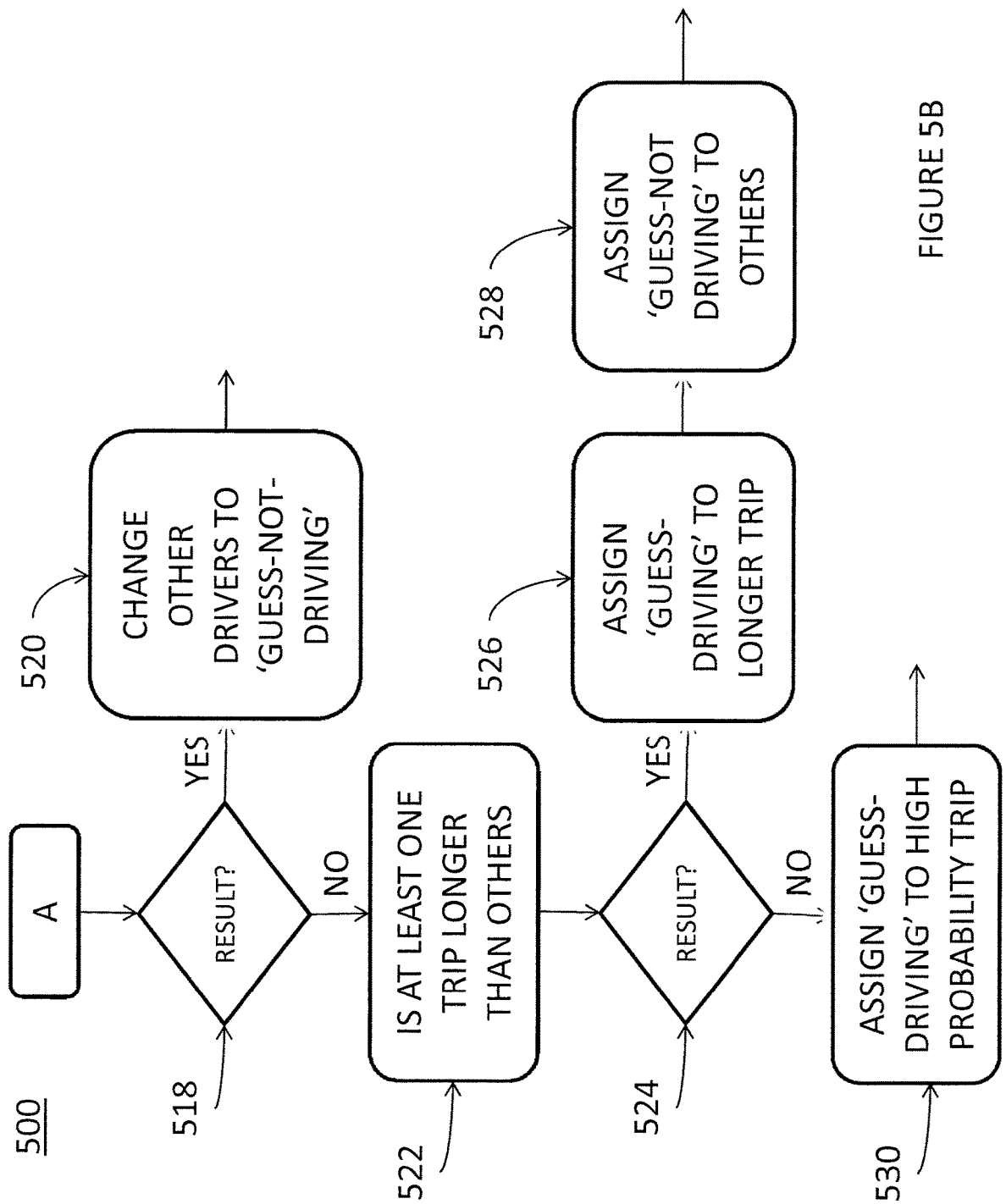

FIGS. 5A and 5B depict an example method 500 for classifying new trip data as possibly part of a shared trip based upon collected user data (e.g., from user devices 110, illustrated in FIG. 1). Method 500 may be performed by DI computing device 102 (shown in FIG. 1).

Method 500 may include receiving 502 new trip data captured by a user device (e.g., user device 110) for processing as described herein and above. New trip data may include a trip identifier and a user identifier associated with at least one user. As described above, new trip data may also include geographical data (e.g., GPS data), timestamp data, user indications (e.g., driving, not driving, unknown), and telematics data in accordance with the geographical data.

Method 500 may further include querying 504 a database, such as database 108 (shown in FIG. 1), by DI computing device 102. Database 108 may be populated with past trip data of users, for example, users of the usage-based insurance platforms and policies. In some embodiments, querying 504 may include generating a query to select relevant past trips based upon certain parameters. For example, a query may be made for all trips made by users within the past 30 days. In another non-limiting example, a query may be made for all trips made by users within the past 30 days and within a certain geographical location (e.g., zip code, state, region, etc.). Next, method 500 may include selecting 506 all logged trips with end times occurring after the start time of the new trip data. This step may eliminate all trips that cannot be a shared trip with the new trip data since a time overlap does not exist. Next, method 500 may further include calculating 508 start and end points of all selected trips. The start and end points may include a margin of error. For example, if a first user device starts a trip at time X, such as 12:00:00 PM, and a second user device starts a trip at time Y, such as 12:00:05, the first and second user device's trips could both be selected. In one embodiment, the start or end time variables may be within a certain time window of the new trip data's start or end time variables. Following the example, the start time window may be set at 20 seconds and, if the new trip data is associated with time Y, the window may be between 11:59:55 and 12:00:15. In some embodiments, the time window may be ten seconds, 20 seconds, 1 minute, 5 minutes, etc. A specific time variable is not meant to be limiting.

Once all logged trips having similar start or end times have been selected, method 500 may include calculating 508 geographical and/or location start/end points for each of the logged trips. For example, calculating 508 may include determining a latitude and longitude for each start and end point of every logged trip. In another embodiment, a start or end point may include a certain landmark, such as a school or a library. All trips having some time overlap as well as similar start and end points may then be selected.

Method 500 may further include performing 510 a distance comparison step for each of the selected trips for comparison with the new trip data. Distance comparison may be performed in view of a cutoff value (e.g., within a fourth or a half of a mile of the starting and ending points of the new trip). In some embodiments, the cutoff value may be based upon temporal GPS accuracy. If the distance of a certain trip is not within the cutoff value, the comparison may not be found to be similar 512 and therefore may not qualify to be a shared trip 514 with the new trip data. If the distance of a certain trip is within the cutoff value, the comparison may be found to be similar 512 (e.g., and the trip may be determined to be a shared trip), and method 500 may continue. Performing 510 the distance comparison may be repeated for each logged trip for comparison with the new trip data.

Method 500 may include, once distance comparison is performed 510, determining 516 if at least one user has self-identified as the driver during the shared trips. In an example embodiment, at least one of the users identified to be part of a shared trip may self-identify as a driver. This self-identification may be performed via a mobile application installed on the user's device (e.g., user device 110). In one embodiment, a user may indicate that they are driving prior to a trip. In another embodiment, a user may indicate that they are driving during a trip. In yet another embodiment, a user may indicate that they were a driver for a recently completed trip. Process 500 continues onto FIG. 5B. In the event that a user did self-identify as a driver, RESULT=YES in step 518, the user may be classified as the driver for the shared trip. All other users of the shared trips may then be classified as not driving. In one embodiment, non-drivers may simply be classified as passengers. In another embodiment, non-drivers may be classified as "GUESS-NOT-DRIVING." Since a user identified as the driver, method 500 may then terminate. If a user did not self-identify as a driver, RESULT=NO in step 518, method 500 may advance.

Method 500 may further include determining 522 if at least one trip among the shared trips is longer than others. In the event that at least one of the logged trips is longer in distance traveled, elapsed time, or a combination thereof, it may be concluded that the user associated with the longer trip started driving and picked up passengers along the way. For example, a user may have started a trip and picked up different passengers for a carpool. In this example, all passengers of the vehicle, as well as the driver, would have different start times but similar, if not the same, end times. Result 524, in this example scenario, would be "YES." Method 500 may further include assigning 526 'GUESS-DRIVING' to the user device associated with the earliest starting time and longest driven distance of the shared trip. Further, method 500 may include assigning 528 'GUESS-NOT-DRIVING' to the other user devices associated with the shared trip. In the event that Result 524=NO, method 500 may further include assigning 530 'GUESS-DRIVING' to user devices where the user associated with the user device is determined to have a high probability of driving. Probability may be determined in a myriad of ways.

In some embodiments, a driving probability may be determined for each trip taken by a user. For example, historical data, telematics data, GPS data, along with other information related to a user's driving history, may be stored in a user profile. The user profile may be stored in a storage location of driver identification computing device 102, such as database 108, for example. Historical data may include past trips taken by a user, including trips when the user was the driver and when the user was a passenger. Some trips taken by the user may be identified as frequent trips. For example, a frequent trip may include a daily commute, a weekly drive to the supermarket on certain days, or the like. Telematics data may be collected over time with respect to user. Collected data may be used to identify a user, much like a fingerprint. In one example, driving style may be determined based upon braking events, sudden or smooth acceleration, and fast/slow cornering, for example.

Exemplary Computer Device

Figure 6:
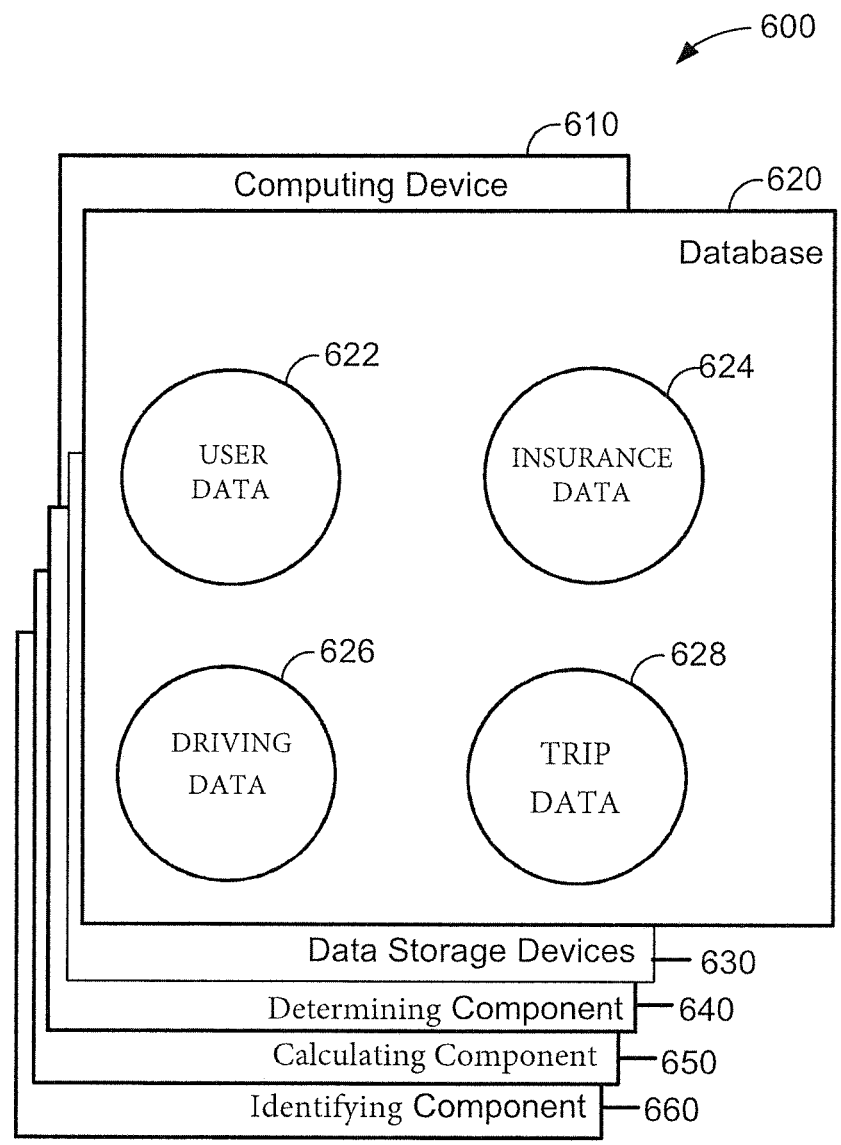
FIG. 6 illustrates a diagram of components of one or more exemplary computing devices that may be used in the DI computer system illustrated in FIG. 1.

FIG. 6 depicts a diagram 600 of components of one or more exemplary computing devices 610 that may be used in DI system 100 shown in FIG. 1. In some embodiments, computing device 610 may be similar to DI computing device 110 (shown in FIG. 1). Database 620 may be coupled with several separate components within computing device 610, which perform specific tasks. In this embodiment, database 620 may include user data 622 (e.g., associated with users associated with user devices 110, shown in FIG. 1), insurance data 624 (e.g., insurance premiums and policies related to usage-based insurance platforms), driving data 626 (e.g., driving characteristics, driving behaviors, telematics data, location data, etc. from user devices 110, shown in FIG. 1), and trip data 628 (e.g., data, like start/end times and points, associated with trips and sub-trips, determined shared trips between users, etc.). In some embodiments, database 620 is similar to database 108 (shown in FIG. 1).

Computing device 610 may include the database 620, as well as data storage devices 630. Computing device 610 may also include a determining component 640, a calculating component 650, and an identifying component 660. Determining component 640 may be configured to determine, based upon a first plurality of measurements and a second plurality of measurements, that a first user device and a second user device (e.g., user devices 110, shown in FIG. 1) are traveling on the trip, and determining, based upon an enhanced geographic location measurement for each of the first plurality of measurements and for each of the second plurality of measurements, a predicted position of the second user device relative to the first user device with respect to a forward direction of travel of a vehicle. Calculating component 650 may be configured to calculate, for example, using a Kalman filter, an enhanced geographic location measurement for each of the first plurality of measurements and each of the second plurality of measurements based upon the measured geographic location, the error estimate, and the telematics data corresponding to each of the first plurality of measurements and second plurality of measurements. Identifying component 660 may be configured to identify, from among the first user device and the second user device, a user device corresponding to a driver based upon the predicted position of the second user device relative to the first user device, the driving characteristics of the current trip compared to the driving characteristics of the users associated with the first and second user devices, etc.

Certain Embodiments

A driver identification (DI) computing device comprising at least one processor in communication with a memory device may be provided. The at least one processor may be configured to: associate a first user with a first user device; associate a second user with a second user device; receive, from the first user device, a first plurality of measurements periodically captured at the first user device during a first trip; receive, from the second user device, a second plurality of measurements periodically captured at the second user device during a second trip; identify a shared trip based upon the captured first and second plurality of measurements; and determine, based upon the captured first and second plurality of measurements, a driver of a vehicle, in response to the first and second trip being a shared trip.

A further enhancement of the DI computing device may include wherein the at least one processor may further configured to, for identifying a shared trip: calculate a time and distance for each of the first trip and the second trip in response to determining that the first trip has a start time or end time that overlaps with the end time or start time of the second trip; calculate an overlapping time and distance between the first trip and the second trip; and calculate a distance shared between the first trip and the second trip.

A further enhancement of the DI computing device may include wherein the at least one processor may be further configured to, for identifying a shared trip: classify the first trip and the second trip as a shared trip in response to determining that the overlapping distance is less than the distance of the first trip or the second trip.

A further enhancement of the DI computing device may include wherein the at least one processor may be further configured to, for determining a driver: designate at least one of the first and second users as a driver of the shared trip based upon at least one of, and in response to: the first or second users self-identifying as the driver; to at least one of the trips taken being longer than the other, designate the user of the longer trip as the driver; and at least one of the first and second users having a higher driving probability for the shared trip.

A further enhancement of the DI computing device may include wherein the higher driving probability may be based at least in part on historical data stored in a user profile of the first or second users.

A further enhancement of the DI computing device may include wherein each of the first plurality of measurements and each of the second plurality of measurements includes timing data, geographical location data, and telematics data.

A further enhancement of the DI computing device may include wherein the first plurality of measurements and the second plurality of measurements may be collected by one or more sensors attached to a vehicle, the first user device, the second user device, or a combination thereof.

In another aspect, a computer-based method for designating a driver of a shared trip between two or more users may be provided. The computer-based method may include collecting, by a plurality of user devices, a plurality of measurements for a plurality of trips; receiving, at a driver identification (DI) computing device, the plurality of measurements; and designating, by the DI computing device, a driver based upon the plurality of measurements. The computer-based method may include additional, less, or alternate functionality, including that discussed elsewhere herein.

A further enhancement of the computer-based method may include: storing the plurality of measurements in a storage device in communication with the DI computing device; associating the plurality of measurements with respective users of the two or more users; and creating a user profile for each of the two or more users based upon the plurality of measurements.

A further enhancement of the computer-based method may include wherein the plurality of measurements include at least one or more of GPS data, time data, and telematics data.

A further enhancement of the computer-based method may include wherein designating a driver further comprises: identifying a shared trip between a plurality of users associated with two or more respective user devices of the plurality of user devices based upon the plurality of measurements.

A further enhancement of the computer-based method may include wherein identifying a shared trip further comprises: calculating an overlapping time and distance for each of the plurality of users based upon the plurality of measurements; and classifying two or more of the plurality of trips as a shared trip in response to the calculated overlapping distance being less than a distance of one of the two or more of the plurality of trips.

In yet another aspect, at least one non-transitory computer-readable storage media having computer-executable instructions embodied thereon may be provided. The instructions, when executed by at least one processor, may cause the processor to: receive trip data from a plurality of user devices, wherein each user device is associated with a user of a plurality of users; identify a first user of the plurality of users having trip data that overlaps with trip data of a second user of the plurality of users; classify at least a portion of the trip data of the first and second users as a shared trip; and designate at least one of the first and second users as a driver of the shared trip. The computer-executable instructions may include additional, less, or alternate functionality, including that discussed elsewhere herein.

A further enhancement of the computer-readable storage media may include wherein the trip data includes one or more of: GPS-based distance, time, and location data.

A further enhancement of the computer-readable storage media may include wherein the step to designate at least one of the first and second users as a driver of the shared trip further comprises: retain driver designation for the first or second user in response to determining that the first or second user was previously designated as driver.

A further enhancement of the computer-readable storage media may include wherein the step to designate at least one of the first and second users as a driver of the shared trip further comprises: designate the first user as driver in response to determining that the GPS-based distance of the first user trip is longer than the second user trip.

A further enhancement of the computer-readable storage media may include wherein the step to designate at least one of the first and second users as a driver of the shared trip further comprises: designate the second user as driver in response to determining that the GPS-based distance of the second user trip is longer than the first user trip.

A further enhancement of the computer-readable storage media may include wherein the step to designate at least one of the first and second users as a driver of the shared trip further comprises: designate at least one of the first user and the second user as driver in response to driver probability data associated with each of the first user and the second user, wherein the driver with higher probability is designated driver of the shared trip.

A further enhancement of the computer-readable storage media may include wherein driver probability data is based upon historical data associated with each of the first and second users.

A further enhancement of the computer-readable storage media may include wherein historical data comprises past trip data including telematics data, GPS-based distance data, and timing data.

Examples of Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any user skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A computing device comprising at least one processor in communication with a memory device, the at least one processor configured to:
   receive, from a first user device, a first plurality of measurements periodically captured by the first user device during a first trip by a first user:
   receive, from a second user device, a second plurality of measurements periodically captured by the second user device during a second trip by a second user, the second user being different from the first user;
   determine whether the first trip and the second trip are a shared trip within a vehicle based at least in part upon the captured first plurality of measurements and the captured second plurality of measurements;
   determine whether the first user and the second user are in the vehicle together during the shared trip; and
   if the first user and the second user have been determined to be in the vehicle together during the shared trip, determine whether the first user or the second user is a driver of the vehicle during the shared trip based at least in part upon the captured first plurality of measurements and the captured second plurality of measurements.

2. The computing device of claim 1, wherein the at least one processor is further configured to:
   calculate a time and a distance for each trip of the first trip and the second trip in response to determining that the first trip overlaps with the second trip in time;
   calculate an overlapping time between the first trip and the second trip; and
   calculate a shared distance between the first trip and the second trip.

3. The computing device of claim 2, wherein the at least one processor is further configured to:
   classify the first trip and the second trip as the shared trip in response to determining that the shared distance is less than the distance of the first trip or the second trip.

4. The computing device of claim 1, wherein the at least one processor is further configured to:
   designate at least one of the first user and the second user as ache driver of the shared trip based at least in part upon at least one of:
   the first user or the second user self-identifying as the driver;

one trip of the first trip and the second trip being longer than the other trip, wherein the first user or the second user of the longer trip is designated as the driver; and one user of the first user and the second user having a higher driving probability of being the driver for the shared trip.

5. The computing device of claim 4, wherein the higher driving probability is based at least in part on historical data stored in user profiles of the first user and the second user.

6. The computing device of claim 1, wherein each measurement of the first plurality of measurements and the second plurality of measurements includes one or more timing data, one or more geographical location data, and one or more telematics data.

7. The computing device of claim 1, wherein the first plurality of measurements and the second plurality of measurements are collected by one or more sensors attached to the vehicle, the first user device, the second user device, or a combination thereof.

8. A computer-implemented method for designating a driver of a shared trip between two or more users, the method comprising:

receiving, from a first user device, a first plurality of measurements periodically captured by the first user device during a first trip by a first user;

receiving, from a second user device, a second plurality of measurements periodically captured by the second user device during a second trip by a second user, the second user being different from the first user;

determining whether the first trip and the second trip are a shared trip within a vehicle based at least in part upon the captured first plurality of measurements and the captured second plurality of measurements;

determining whether the first user and the second user are in the vehicle together during the shared trip; and if the first user and the second user have been determined to be in the vehicle together during the shared trip, determining whether the first user or the second user is the driver of the vehicle during the shared trip based at least in part upon the captured first plurality of measurements and the captured second plurality of measurements.

9. The computer-implemented method of claim 8, further comprising:

storing the captured first plurality of measurements and the captured second plurality of measurements in a storage device in communication with a computing device;

associating the captured first plurality of measurements and the captured second plurality of measurements with respective users of the two or more users; and creating a user profile for each user of the two or more users based at least in part upon the captured first plurality of measurements and the captured second plurality of measurements.

10. The computer-implemented method of claim 8, wherein the captured first plurality of measurements and the captured second plurality of measurements include one or more geographical location data, one or more timing data, and one or more telematics data.

11. The computer-implemented method of claim 8, further comprising:

determining the shared trip between a plurality of users associated with a plurality of user devices respectively based at least in part upon a plurality of measurements captured by the plurality of user devices.

12. The computer-implemented method of claim 11, wherein determining the shared trip further comprises:

calculating an overlapping time and an overlapping distance for each user of the plurality of users based at least in part upon the plurality of measurements captured by the plurality of user devices; and classifying two or more trips of a plurality of trips as the shared trip in response to the overlapping distance being less than a distance of one trip of the two or more trips of the plurality of trips.

13. A non-transitory computer-readable storage media having computer-executable instructions embodied thereon that, when executed by at least one processor, cause the at least one processor to:

receive a first plurality of measurements periodically captured by a first user device during a first trip by a first user;

receive a second plurality of measurements periodically captured by a second user device during a second trip by a second user;

determine whether the first trip and the second trip are a shared trip within a vehicle based at least in part upon the captured first plurality of measurements and the captured second plurality of measurements;

determine whether the first user and the second user are in the vehicle together during the shared trip; and if the first user and the second user have been determined to be in the vehicle together during the shared trip, determine whether the first user or the second user is a driver of the vehicle during the shared trip based at least in part upon the captured first plurality of measurements and the captured second plurality of measurements.

14. The non-transitory computer-readable storage media of claim 13, wherein the first plurality of measurements and the second plurality of measurements include one or more GPS-based distance data, one or more timing data, and one or more telematics data.

15. The non-transitory computer-readable storage media of claim 14, wherein the computer-executable instructions that cause the at least one processor to determine whether the first user or the second user is the driver further cause the at least one processor to:

designate the first user or the second user as the driver; and retain the driver designation for the first user or the second user in response to determining that the first user or the second user was previously designated as the driver.

16. The non-transitory computer-readable storage media of claim 15, wherein the computer-executable instructions that cause the at least one processor to designate the first user or the second user as the driver further cause the at least one processor to:

designate the first user as the driver in response to determining that a GPS-based distance of the first trip is longer than a GPS-based distance of the second trip.

17. The non-transitory computer-readable storage media of claim 15, wherein the computer-executable instructions that cause the at least one processor to designate the first user or the second user as the driver further cause the at least one processor to:

designate the second user as the driver in response to determining that a GPS-based distance of the second trip is longer than a GPS-based distance of the first trip.

18. The non-transitory computer-readable storage media of claim 15, wherein the computer-executable instructions that cause the at least one processor to designate the first user or the second user as the driver further cause the at least one processor to:
  designate the first user or the second user as the driver in response to driver probability data associated with each user of the first user and the second user, wherein the first user or the second user with a higher probability of being the driver is designated as the driver of the shared trip.

19. The non-transitory computer-readable storage media of claim 18, wherein the driver probability data are based at least in part upon historical data associated with each user of the first user and the second user.

20. The non-transitory computer-readable storage media of claim 19, wherein the historical data comprise past trip data including telematics data, GPS-based distance data, and timing data.

\* \* \* \* \*